(12) United States Patent
Takahashi et al.

(10) Patent No.: US 10,977,341 B2
(45) Date of Patent: Apr. 13, 2021

(54) INSOLATION PROBABILITY DISTRIBUTION ANALYSIS METHOD, INSOLATION PROBABILITY DISTRIBUTION ANALYSIS SYSTEM, INSOLATION PROBABILITY DISTRIBUTION ANALYSIS PROGRAM PRODUCT, INSOLATION NORMALIZATION STATISTICAL ANALYSIS METHOD, INSOLATION NORMALIZATION STATISTICAL ANALYSIS SYSTEM, AND INSOLATION NORMALIZATION STATISTICAL ANALYSIS PROGRAM PRODUCT

(71) Applicant: HIDE HOUSING CORPORATION, Toyohashi (JP)

(72) Inventors: Hideyuki Takahashi, Aichi (JP); Yoshio Horiuchi, Aichi (JP)

(73) Assignee: Hide Housing Corporation, Aichi (JP)

( * ) Notice: Subject to any disclaimer, the term of this patent is extended or adjusted under 35 U.S.C. 154(b) by 0 days.

(21) Appl. No.: 16/623,716

(22) PCT Filed: Sep. 13, 2019

(86) PCT No.: PCT/JP2019/036016
§ 371 (c)(1),
(2) Date: Dec. 17, 2019

(87) PCT Pub. No.: WO2020/148940
PCT Pub. Date: Jul. 23, 2020

(65) Prior Publication Data
US 2020/0394255 A1 Dec. 17, 2020

(30) Foreign Application Priority Data

Jan. 18, 2019 (JP) .............................. JP2019-006476
Jan. 18, 2019 (JP) .............................. JP2019-006477

(51) Int. Cl.
*G06F 17/18* (2006.01)
*G01W 1/12* (2006.01)
(Continued)

(52) U.S. Cl.
CPC ............... *G06F 17/18* (2013.01); *G01W 1/12* (2013.01); *G06N 7/005* (2013.01); *H02S 99/00* (2013.01)

(58) Field of Classification Search
None
See application file for complete search history.

(56) References Cited

U.S. PATENT DOCUMENTS 10,103,548 B2 * 10/2018 He .......................... H02J 3/386
2014/0207837 A1 7/2014 Taniguchi et al.
(Continued)

FOREIGN PATENT DOCUMENTS

CN 101718880 6/2010
CN 102663263 9/2012
(Continued)

OTHER PUBLICATIONS

Nakao, et al., "Optimal Operation Planning for Renewable Energy Management Based on Large-scale Simulation", Fujitsu, vol. 65, No. 2, Mar. 1, 2014, p. 28-33—with an English Abstract.
(Continued)

*Primary Examiner* — Gregory J Toatley, Jr.
*Assistant Examiner* — Terence E Stifter, Jr.
(74) *Attorney, Agent, or Firm* — Hamre, Schumann, Mueller & Larson, P.C.

(57) ABSTRACT

Statistical processing of insolation data for calculation prediction which requires calculation with conditional branching using an insolation as a variable, or analyze a histogram of an insolation probability distribution based on a probabilistic analysis and mathematically model the insolation as
(Continued)

a calculation formula. The techniques described herein can be used to help predict the solar power generation by a solar power generation system.

11 Claims, 5 Drawing Sheets

(51) Int. Cl.
*G06N 7/00* (2006.01)
*H02S 99/00* (2014.01)

(56) References Cited

U.S. PATENT DOCUMENTS

| 2017/0075025 | A1 | 3/2017 | Hayler et al. |
| 2017/0075035 | A1* | 3/2017 | Kakimoto ............... G01W 1/10 |
| 2018/0240048 | A1* | 8/2018 | Wang ..................... G06Q 50/06 |

FOREIGN PATENT DOCUMENTS

| CN | 107732970 | 2/2018 |
| JP | 2006-304402 | 11/2006 |
| JP | 2013-036820 | 2/2013 |
| JP | 2013-258796 | 12/2013 |
| JP | 2014-021555 | 2/2014 |
| JP | 2015-137903 | 7/2015 |
| JP | 2016-057090 | 4/2016 |
| JP | 2017-053804 | 3/2017 |
| JP | 2017-084360 | 5/2017 |
| JP | 2017-127140 | 7/2017 |
| WO | 2013/042213 | 3/2013 |

OTHER PUBLICATIONS

Yokoyama, et al., "A Method of Evaluating the Performance of a Stand-Alone Photovoltaic System in Consideration of its Probabilistic Characteristics", Transactions of the Japan Society of Mechanical Engineers, C, vol. 63, No. 608, pp. 191-198 (pp. 1229-1236)—with an English Abstract.

International Search Report and Written Opinion issued in International Application No. PCT/JP2018/036017, dated Nov. 19, 2019, 6 pages.

International Search Report and Written Opinion issued in International Application No. PCT/JP2018/036016, dated Oct. 29, 2019, 13 pages.

Office Action in corresponding Chinese Patent Application No. 201980003906.X, dated Feb. 3, 2021, 5 pages.

* cited by examiner (a)

(b)

INSOLATION PROBABILITY DISTRIBUTION ANALYSIS METHOD, INSOLATION PROBABILITY DISTRIBUTION ANALYSIS SYSTEM, INSOLATION PROBABILITY DISTRIBUTION ANALYSIS PROGRAM PRODUCT, INSOLATION NORMALIZATION STATISTICAL ANALYSIS METHOD, INSOLATION NORMALIZATION STATISTICAL ANALYSIS SYSTEM, AND INSOLATION NORMALIZATION STATISTICAL ANALYSIS PROGRAM PRODUCT

TECHNICAL FIELD

The present invention relates to an insolation probability distribution analysis method, an insolation probability distribution analysis system, an insolation probability distribution analysis program product, an insolation normalization statistical analysis method, an insolation normalization statistical analysis system, and an insolation normalization statistical analysis program product.

BACKGROUND ART

Sunlight is an energy source in the global environment, and is one of important biological, meteorological, and engineering factors. The use of solar energy in the engineering field is implemented in the form of solar power generation. In solar power generation, establishment of an insolation evaluation method has been regarded as one of important issues to achieve for accurate calculation prediction of power generation.

A solar power generation is determined based on multiple factors constituted by meteorological factors and electronic factors. The meteorological factors herein include influences of the weather on the insolation, and influences of aerosol on the insolation. In addition, the electronic factors include power generation characteristics associated with a solar panel and the like, and power conversion characteristics associated with an inverter device and the like.

CITATION LIST

Patent Literature

Patent Literature 1: JP 2017-053804 A

SUMMARY OF INVENTION

Technical Problem

Precise prediction of a solar power generation is achieved by calculation with conditional branching considering multiple factors constituted by meteorological factors and electronic factors. Specifically, when a current exceeding orthogonal transform efficiency of a power generation system is generated, calculation with conditional branching considering the AC/DC conversion efficiency is required. Accordingly, an insolation correlated with the power generation needs to be quantified in the form of a probability distribution as in Patent Literature 1, rather than in the form of an average value per unit time.

An appearance probability distribution of an insolation is influenced by meteorological factors including a plurality of factors. Accordingly, it is preferable to use a simplified method capable of clearly evaluating each of the plurality of factors.

The present invention is performed in view of the above situations. It is a problem to be solved to simplify statistical processing of insolation data for calculation prediction which requires calculation with conditional branching using an insolation as a variable, or perform a numerical modeling of the insolation as a calculation formulae by analyzing a histogram of an insolation probability distribution based on a probabilistic analysis.

Solution to Problem

For solving the above problem, the present invention is directed to an insolation probability distribution analysis method characterized by causing a processor of a computer to execute: a step of receiving an input of insolation data, and storing the insolation data in a database; a step of determining an insolation probability distribution based on the insolation data; a step of determining an insolation estimation model that consists of a first mode and a first deviation associated with a first probability density function, a second mode and a second deviation associated with a second probability density function, a distribution coefficient of the first probability density function, and a distribution coefficient of the second probability density function based on the insolation probability distribution, the first probability density function, and the second probability density function, and storing the insolation estimation model in the database; and a step of storing an integrated value indicating an overlap of probability distributions based on the insolation estimation model in the database as a degree of superposition. The method is characterized in that the first probability density function and the second probability density function are Gaussian functions.

By adopting such a configuration, the present invention is capable of mathematically modeling the insolation based on probabilistic analysis, and simplifying the insolation. Moreover, by adopting such a configuration, the present invention further produces such a technical advantageous effect that efficient calculation of an insolation based on a mathematical model, and an expected value of a calculation value obtained by using an insolation as a variable is achievable. By adopting such a configuration, the present invention is capable of expressing statistical data indicating an insolation as a simple mathematical model in the form of a mixed Gaussian distribution based on a Gaussian function which is a probability distribution in conformity with the central limit theorem. Furthermore, by adopting such a configuration, the present invention further produces such a technical advantageous effect that efficiency of approximation processing of the insolation probability distribution improves by using a simple mathematical model which does not include an objective variable indicating asymmetry in a distribution curve.

In a preferred embodiment of the present invention, the insolation probability distribution analysis method is characterized by causing the processor of the computer to execute an evaluation step of determining a weighted average of an insolation associated with the insolation data using an arithmetic device based on at least one of the first mode, the first deviation, the second mode, the second deviation, the distribution coefficient of the first probability density function, and the distribution coefficient of the second probability density function included in the insolation estimation model and stored in the database, and the first probability density function and the second probability density function, and storing the determined weighted average in the database. By adopting such a configuration, the present invention is capable of easily evaluating the expected value of the insolation based on the insolation estimation model. Moreover, by adopting such a configuration, the present invention further produces such a technical advantageous effect that the execution frequency of reference processing associated with statistical data indicating the insolation in the database can be lowered for reduction of a database load.

In a preferred embodiment of the present invention, the insolation probability distribution analysis method is characterized by causing the processor of the computer to execute a display step of displaying the insolation probability distribution and the probability distribution based on the insolation estimation model stored in the database, by using an output device in such a manner that the respective distributions overlap with each other. By adopting such a configuration, the present invention is capable of intuitively transmitting information associated with the statistical data indicating insolation to a user. Moreover, by adopting such a configuration, the present invention further produces such a technical advantageous effect that data reference is achievable in the form of the probability density distribution for reduction of a database load without reference to the whole of a data table showing statistical data indicating the insolation.

The present invention is directed to an insolation probability distribution analysis system characterized by including: means for receiving an input of insolation data, and storing the insolation data in a database; means for determining an insolation probability distribution based on the insolation data; means for determining an insolation estimation model that consists of a first mode and a first deviation associated with a first probability density function, a second mode and a second deviation associated with a second probability density function, a distribution coefficient of the first probability density function, and a distribution coefficient of the second probability density function based on the insolation probability distribution, the first probability density function, and the second probability density function, and storing the insolation estimation model in the database; and means for storing an integrated value indicating an overlap of probability distributions based on the insolation estimation model in the database as a degree of superposition. The first probability density function and the second probability density function are Gaussian functions.

The present invention is directed to an insolation probability distribution analysis program characterized by causing a computer to function as: means for receiving an input of insolation data, and storing the insolation data in a database; means for determining an insolation probability distribution based on the insolation data; means for determining an insolation estimation model that consists of a first mode and a first deviation associated with a first probability density function, a second mode and a second deviation associated with a second probability density function, a distribution coefficient of the first probability density function, and a distribution coefficient of the second probability density function based on the insolation probability distribution, the first probability density function, and the second probability density function, and storing the insolation estimation model in the database; and means for storing an integrated value indicating an overlap of probability distributions based on the insolation estimation model in the database as a degree of superposition. The first probability density function and the second probability density function are Gaussian functions.

For solving the above problem, the present invention is directed to an insolation normalization statistical analysis method characterized by causing a processor of a computer to execute: a management step of receiving an input of insolation data; an analysis step of extracting a reference insolation by performing interpolation based on polynomial approximation into the insolation data, determining a dimensionless amount that is a ratio of an insolation and the reference insolation, and determining an insolation probability distribution that uses the dimensionless amount as a random variable based on the insolation data.

By adopting such a configuration, the present invention is capable of evaluating the insolation based on probabilistic analysis. Moreover, by adopting such a configuration, the present invention further produces such a technical advantageous effect that a considerable amount of statistical data indicating the insolation can be simplified for reduction of a database load including data reference and data storage. Furthermore, by adopting such a configuration, the present invention is capable of evaluating the insolation in the form of a relative value containing a gap between the insolation and a reference insolation.

In a preferred embodiment of the present invention is characterized in that the reference insolation is an average value of insolation obtained for each day or each month.

In a preferred embodiment of the present invention, the insolation normalization statistical analysis method is characterized by causing the processor of the computer to execute a display step of performing display processing of the insolation probability distribution.

In a preferred embodiment of the present invention, the insolation normalization statistical analysis method corresponds to an estimated insolation probability distribution determined by curve fitting processing based on a mixed Gaussian function including a first Gaussian function and a second Gaussian function.

The present invention is directed to an insolation normalization statistical analysis system characterized by including: management means for receiving an input of insolation data; and analysis means for extracting a reference insolation by performing interpolation based on polynomial approximation into the insolation data, determining a dimensionless amount that is a ratio of an insolation and the reference insolation, and determining an insolation probability distribution that uses the dimensionless amount as a random variable based on the insolation data.

The present invention is directed to an insolation normalization statistical analysis program characterized by causing a computer to function as: management means for receiving an input of insolation data; and analysis means for extracting a reference insolation by performing interpolation based on polynomial approximation into the insolation data, determining a dimensionless amount that is a ratio of an insolation and the reference insolation, and determining an insolation probability distribution that uses the dimensionless amount as a random variable based on the insolation data.

Advantageous Effects of Invention

According to the present invention, focusing on an insolation probability distribution is allowed rather than focusing on an insolation transition on a time axis. Moreover, according to the present invention, a histogram of an insolation probability distribution can be produced based on a relative value obtained as a gap between an insolation and an average line of the insolation.

DESCRIPTION OF EMBODIMENTS

A system 1 according to the present invention will be hereinafter described with reference to the drawings. An embodiment described below is presented by way of example of the present invention. The present invention is not limited to the following embodiment, but is allowed to adopt various other configurations.

In the present embodiment, a configuration, an operation, and others of the system 1 will be described. Similar actions and effects are also produced by a method, a program, a recording medium, and others each having a similar configuration.

A program 2001 in the present embodiment is preferably recorded in a non-transitory recording medium. Introduction of the program 2001 into a computer apparatus 2 is achievable by using this recording medium.

Functions associated with the system 1 are implemented by computer resources of the computer apparatus 2 under an application including the program 2001 stored in the computer apparatus 2. This application is implemented in the form of installed software or cloud software.

Figure 1:
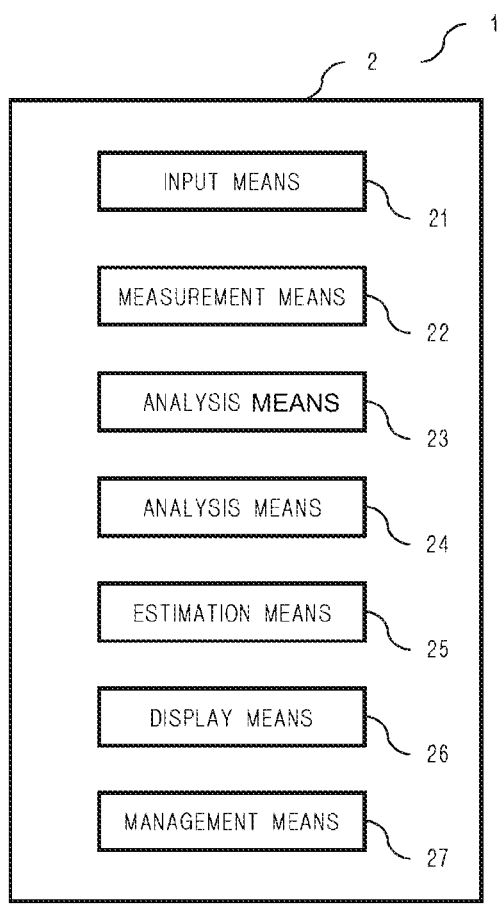
FIG. 1 is a functional block diagram according to an embodiment of the present invention.

FIG. 1 is a functional block diagram of the system 1 according to the embodiment of the present invention.

The computer apparatus 2 in the system 1 includes input means 21, measurement means 22, analysis means 23, analysis means 24, estimation means 25, display means 26, and management means 27.

The input means 21 is used for performing input processing associated with the system 1. For example, the input means 21 is used for performing input processing which inputs insolation data. According to the present embodiment, the data subjected to the input processing by the input means 21 is stored in a database DB of the computer apparatus 2.

The input means 21 of each of a plurality of the computer apparatuses 2 may be configured to perform the input processing using a network NW and an application programming interface.

The measurement means 22 is used for performing measurement processing which measures a total insolation. This insolation is measured every second, every minute, every hour, every day, every month, every season, or every year. In this case, the insolation may be an instantaneous insolation at the time of measurement, a total insolation from a previous measurement time, or an average insolation per unit time.

The analysis means 23 is used to determine an insolation probability distribution D1. The insolation probability distribution D1 is determined based on insolation data. In this case, the insolation data may be an insolation measured by the measurement means 22, or may be an average insolation included in statistical data indicating an insolation published by an external service. In this case, the insolation data includes time series data indicating the insolation or the average insolation.

The analysis means 23 is preferably configured to store data associated with the insolation probability distribution D1 in the database DB in the form of a data table containing a dimensionless amount indicating an insolation normalized based on a reference insolation (normal insolation), and an insolation probability distribution associated with this insolation.

The reference insolation is preferably an average of the total insolation included in the insolation data. The reference insolation may have a configuration based on statistical data indicating an insolation published by the external service.

The analysis means 23 is preferably configured to perform polynomial approximation for insolation data R1 to determine insolation interpolation data R2, and extract a reference insolation for each day. This polynomial approximation is preferably performed based on a polynomial including a plurality of trigonometric functions. Interpolation into the insolation data according to the present embodiment may be performed in the form of spline interpolation. The method for the interpolation is not particularly limited.

The analysis means 24 performs curve fitting processing for data associated with the insolation probability distribution D1 based on a mixed Gaussian function (P(x)) constituted by a first Gaussian function and a second Gaussian function expressed by following formula 1. A random variable (x) in the mixed Gaussian function indicates a dimensionless quantity as a normalized insolation.

$$P(x) = \frac{\alpha}{\sqrt{2\pi}\,\sigma_a} e^{\left(-\frac{(x-\mu_a)^2}{2\sigma_a^2}\right)} + \frac{\beta}{\sqrt{2\pi}\,\sigma_b} e^{\left(-\frac{(x-\mu_b)^2}{2\sigma_b^2}\right)}$$

The analysis means 24 performs curve fitting processing using, as unknown objective variables, objective variables including a first mode ($\mu\_a$) and a first deviation ($\sigma\_a$) associated with the first Gaussian function, and a second mode ($\mu\_b$) and a second deviation ($\sigma\_b$) associated with the second Gaussian function, a distribution coefficient ($\alpha$) of the first Gaussian function and a distribution coefficient ($\beta$) of the second Gaussian function. In this case, the analysis means 24 stores, in the database DB, the first mode, the first deviation, and the distribution coefficient of the first Gaussian function as a first objective variable set, and the second mode, the second deviation, and the distribution coefficient of the second Gaussian function as a second objective variable set. The distribution coefficient in the present embodiment is synonymous with a mixing coefficient.

The analysis means 24 preferably performs the curve fitting processing based on a nonlinear least square method. Solution search in the curve fitting processing is performed based on a generalized simplified gradient method or a simplex method.

According to the present embodiment, background removal may be carried out in the curve fitting processing performed by the analysis means 24. In this case, the analysis means 24 performs the background removal for the insolation probability distribution D1 based on a linear method or a Shirley method to extract an insolation probability distribution close to any dimensionless amount.

The probability density function according to the present embodiment may be a Lorentz function or a Voigt function. The probability density function according to the present embodiment may become an insolation estimation model of the present embodiment when the object variable corresponds to a peak shape function capable of expressing a continuous probability distribution.

The analysis means 24 may be configured to perform the curve fitting processing using, as a known objective variable, one of the first mode ($\mu\_a$) and the first deviation ($\sigma\_a$) associated with the first Gaussian function, and the second mode ($\mu\_b$) and the second deviation ($\sigma\_b$) associated with the second Gaussian function, and the distribution coefficients ($\alpha$) and ($\beta$) of the first Gaussian function and the second Gaussian function.

The estimation means 25 determines an estimated insolation probability distribution D2 based on at least one of the objective variables included in the insolation estimation model determined by the analysis means 24, and the mixed Gaussian function (P(x)). In this case, the estimation means 25 determines a weighted average of the insolation based on the estimated insolation probability distribution D2, and stores the weighted average in the database DB.

The display means 26 is used for performing display processing associated with the system 1. For example, the display means 26 performs display processing based on the insolation probability distribution D1 or the estimated insolation probability distribution D2. The probability distribution in the present embodiment is displayed in the form of a graph, a chart or a plot by the display processing. The display processing may be configured to be performed by a plurality of the computer apparatuses 2 in cooperation with each other based on an object-oriented script language such as JavaScript (registered trademark).

The management means 27 is used for managing the database DB associated with the system 1. The management means 27 receives the insolation data input by the inputting processing, and stores the insolation data in the database DB. The management means 27 updates the database DB while associating regional data indicating information about a measurement point of the insolation, and time data indicating information about a measurement time of the insolation with the insolation data, the insolation probability distribution D1, the insolation estimation model, the estimated insolation probability distribution D2, and the weighted average. The database DB is constructed in the form of a relational database, a column type database, or key-value store. According to the present embodiment, data included in the database DB may be encrypted based on a one-way function.

The management means 27 may be configured to store, in the database DB, a degree of superimposition based on the first probability density function and the second probability density function. The degree of superimposition indicates a value expressed in the form of an integrated value to show an overlap of the probability distribution based on the first Gaussian function and the probability distribution based on the second Gaussian function in the estimated insolation probability distribution D2. The degree of superimposition is preferably associated with regional data and/or time data.

The management means 27 may be configured to store, in the database DB, a degree of separation based on the first probability density function and the second probability density function. The degree of separation indicates a value expressing a difference between the first mode and the second mode in the estimated insolation probability distribution D2. The degree of separation is preferably associated with regional data and/or time data.

Figure 2:
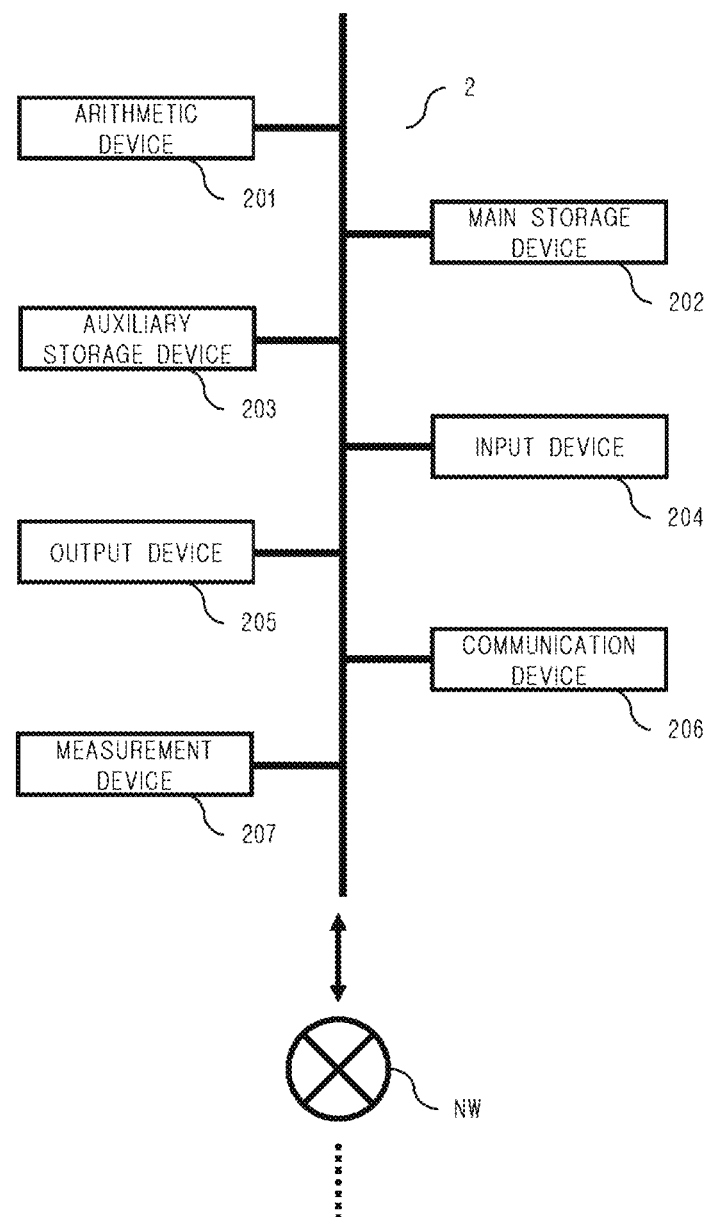
FIG. 2 is a hardware configuration diagram according to the embodiment of the present invention.

FIG. 2 is a hardware configuration diagram of the system 1 according to the embodiment of the present invention.

The computer apparatus 2 includes an arithmetic device 201, a main storage device 202, an auxiliary storage device 203, an input device 204, an output device 205, a communication device 206, a measurement device 207, and a bus interface for interconnection.

The arithmetic device 201 includes a processor capable of executing a command set. The main storage device 202 includes a volatile memory such as a random access memory (RAM). According to the present embodiment, the computer apparatus 2 may include a system-on-chip (SoC) containing the arithmetic device 201 and the main storage device 202. This SoC may include a coprocessor containing an integrated circuit optimized for a specific application including encoding and machine learning.

The auxiliary storage device 203 is used as the database DB corresponding to a storage destination of various data associated with the system 1. The auxiliary storage device 203 includes a nonvolatile memory. The nonvolatile memory may be a semiconductor memory such as a flash memory, or a hard disk drive. The recording method is not particularly limited.

The auxiliary storage device 203 stores the program 2001, and further stores an operating system (OS 2002), and a device driver corresponding to the input device 204, the output device 205, the communication device 206, or the measurement device 207.

The auxiliary storage device 203 may be configured to store a browser application for using web pages for insolation normalization statistical analysis systems, and a mailer application for checking notifications associated with the system 1.

The input device 204 is used by a user to perform the input processing using the input means 21. The input device 204 includes a keyboard or a touch panel. The input method of the input device 204 is not particularly limited. The output device 205 is used for performing the display processing using the display means 26. The output device 205 includes a video memory which stores a frame buffer associated with the display processing, and a display. The display driving method is not particularly limited.

The communication device 206 is used for performing communication processing in the network NW using at least one of a wireless wide area network (WAN), a local area network (LAN), and a personal area network (PAN). This communication processing is performed under a wired communication standard or a wireless communication standard. For example, Ethernet (registered trademark) is used for the wired communication standard. Wi-Fi (registered trademark) is used for the wireless communication standard. A radio wave, a sound wave, or a light wave may be used as a communication medium of the wireless communication standard.

The network NW according to the present embodiment uses transmission control protocol/internet protocol (TCP/IP) as a communication protocol, for example. The network NW may use a community antenna television (CATV) line, a mobile communication network, an air communication network, or a satellite communication network. The type of the network is not particularly limited.

The measurement device 207 includes a pyranometer containing a thermoelectric element or a photoelectric element. According to the present embodiment, the measurement device 207 may be configured to be remotely controlled by the computer apparatus 2 via the network NW. In this case, data associated with the total insolation obtained by the measurement device 207 is transmitted via the network NW and stored in the database DB. This data may be included in the insolation data.

The computer apparatus 2 according to the present embodiment may be constituted by a workstation, or may be a mobile terminal such as a smartphone and a tablet. The computer apparatus 2 may be a single board type apparatus such as Raspberry Pi (registered trademark).

Figure 3:
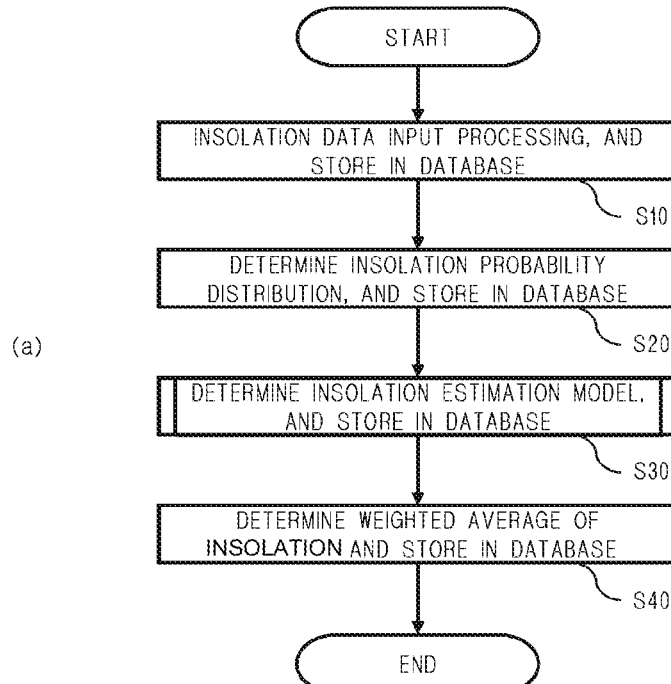
FIG. 3 is a process flowchart according to the embodiment of the present invention.
Figure 3:
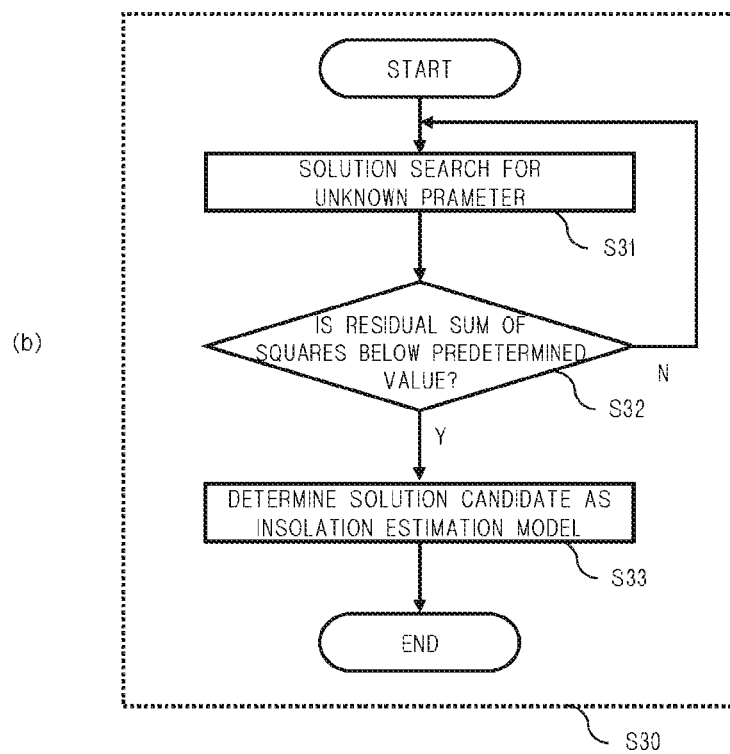

FIG. 3 shows a process flowchart of the system 1.

According to the present embodiment, the input means 21, or a set of the input means 21 and the measurement means 22, initially performs input processing for inputting insolation data. This data is received by the management means 27 (first step S10) as shown in FIG. 3(a). Subsequently, the insolation probability distribution D1 is determined by the analysis means 23 (second step S20). Thereafter, an insolation estimation model is determined by the analysis means 24 (third step S30). Finally, the estimated insolation probability distribution D2 and a weighted average of an insolation are determined by the estimation means 25 (fourth step S40). The display means 26 and the management means 27 are preferably configured to sequentially perform respective functions of the display means 26 and the management means 27 in the corresponding steps.

As shown in FIG. 3(b), a solution search for an unknown objective variable is performed in the third step S30 based on the insolation probability distribution D1, the first probability density function, and the second probability density function (first analysis step S31). When a residual sum of squares of a probability distribution based on a solution candidate obtained in the process of the solution search, and the insolation probability distribution D1 is below a predetermined value (Yes (Y) in second analysis step S32), this solution candidate is stored in the database DB as an insolation estimation model (third analysis step S33). When the residual sum of squares does not fall below the predetermined value (No (N) in second analysis step S32), the process shifts to a state immediately before the second analysis step S32.

Figure 4:
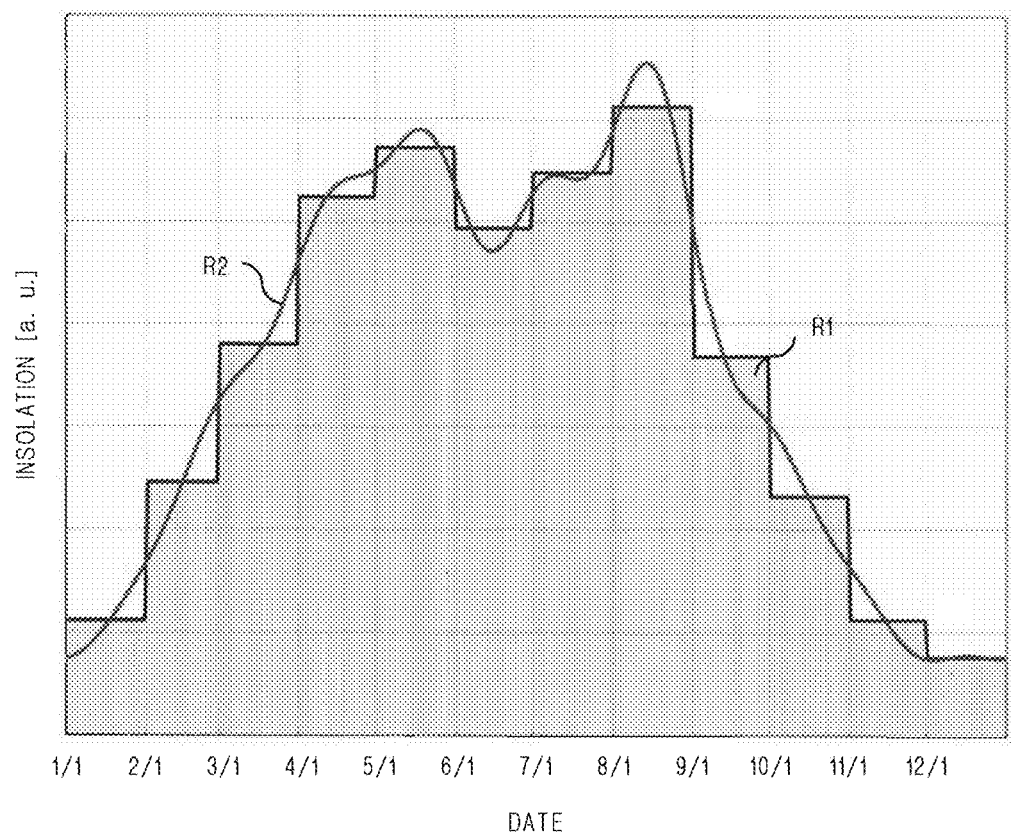
FIG. 4 is a diagram showing insolation data and an approximation example of this data according to the embodiment of the present invention.

FIG. 4 illustrates insolation data and an approximation example of this data.

As described above, the analysis means 23 performs polynomial interpolation based on the insolation data R1 to determine the insolation interpolation data R2. In this case, it is preferable that a reference insolation for each day is extracted from the insolation interpolation data R2.

Figure 5:
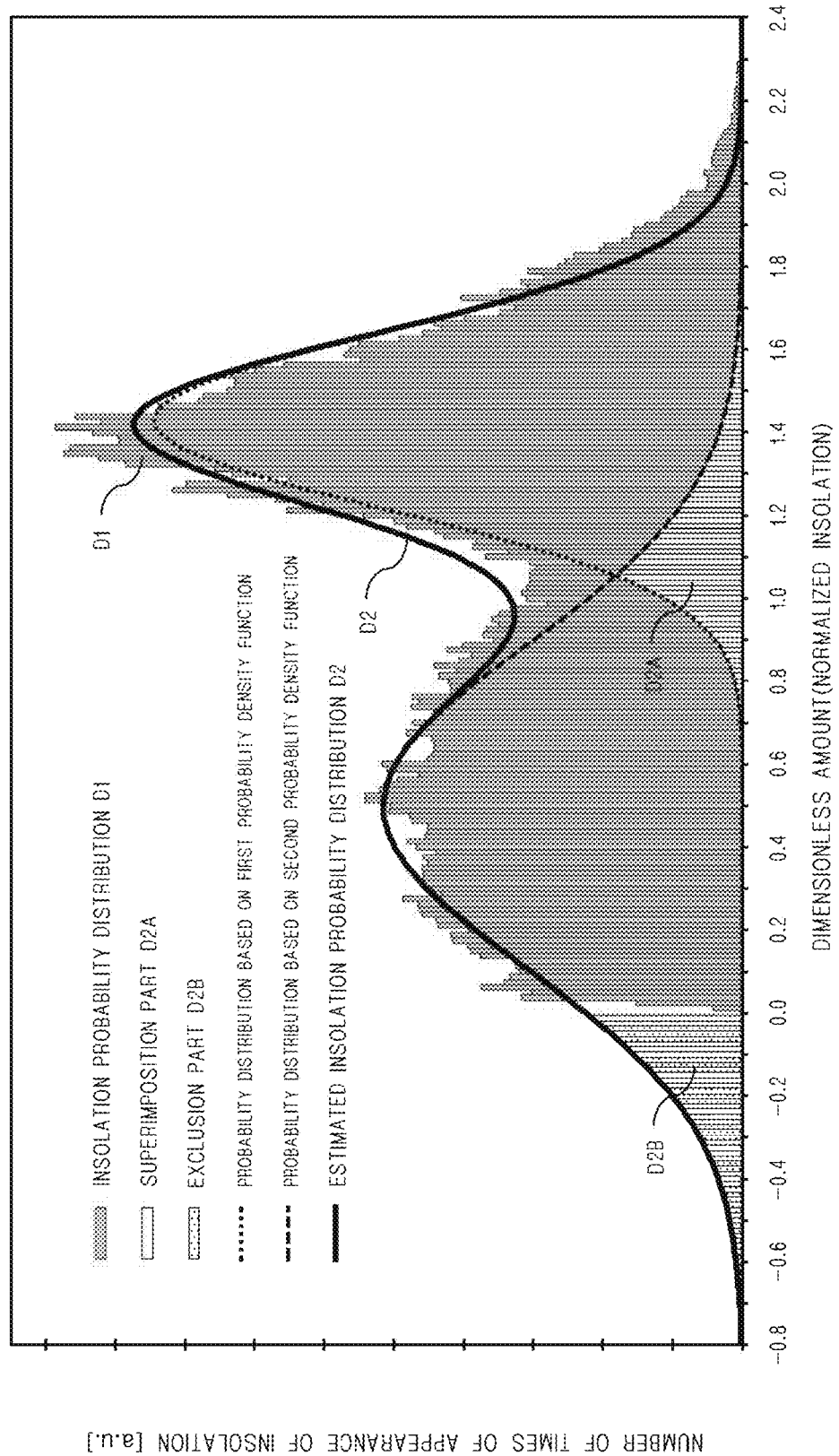
FIG. 5 is a diagram showing a display example of an insolation probability distribution according to the embodiment of the present invention.

FIG. 5 shows a display example of the insolation probability distribution D1 and the estimated insolation probability distribution D2.

As described above, the estimated insolation probability distribution D2 is determined by curve fitting processing performed for the insolation probability distribution D1. The estimated insolation probability distribution D2 includes a linear combination of the probability distribution based on the first probability density function and the probability distribution based on the second probability density function. In this case, the first mode ($\mu\_a$) and the first deviation ($\sigma\_a$) associated with the first probability density function (Gauss function), the second mode ($\mu\_b$) and the second deviation ($\sigma\_b$) associated with the second probability function (Gauss function), the distribution coefficient (a) of the first probability density function (Gauss function), and the distribution coefficient ($\beta$) of the second probability density function (Gauss function) in FIG. 5 are −50.3, 38.6, 1.1, 42.8, 21.3, and 1.0, respectively, and the distribution coefficients are appropriately doubled based on the absolute values of the number of times of appearance of the insolation. An integrated value associated with a superimposition part D2A in FIG. 5 corresponds to the above-described degree of superimposition.

The insolation probability distribution D1 and the estimated insolation probability distribution D2 in FIG. 5 contain the superimposition part D2A having a ratio of 6.1% to the entire estimated insolation probability distribution D2, and a standard error having a ratio of 14.5% to the average estimated insolation probability distribution D2. In addition, an error rate based on the total expected value of the number of times of appearance of insolation equal to or larger than a dimensionless amount of 1.0, and the total expected value of the number of times of appearance of insolation equal to or smaller than the dimensionless amount of 1.0 is 0.075%. In this case, the estimated insolation probability distribution D2 does not contain an exclusion part corresponding to the probability of the dimensionless amount smaller than 0.0 in FIG. 5.

For example, the probability distribution based on the first probability density function, and the probability distribution based on the second probability density function in the present embodiment may be interpreted as influences on the insolation by factors different from each other, including an influence on the insolation by the weather, or an influence on the insolation by aerosol, for example. In this case, the first objective variable set, the second objective variable set, and the degree of superimposition are stored in the database DB as information indicating these factors which are quantified.

The probability distribution according to the present embodiment may be configured to be stored in the database DB as a correspondence relationship between a random variable and the number of times of appearance (number of times of occurrence) or a probability, and subjected to the display processing. In this case, needless to say, the probability is determined based on the total number of times of appearance.

According to the present invention, a processor of a computer is caused to execute a management step of receiving an input of insolation data, and an analysis step of determining an insolation probability distribution based on the insolation data. The insolation probability distribution uses a dimensionless amount as a random variable. According to the present invention, therefore, focusing on the insolation probability distribution is allowed rather than focusing on an insolation transition on a time axis. In addition, according to the present invention, a histogram of an insolation probability distribution can be produced based on a relative value obtained as a deviation of an insolation from an average line of the insolation. Note that in the disclosed embodiment, the insolation probability indicates an insolation appearance probability. Note that in the disclosed embodiment, the insolation indicates a flux of insolation or an insolation amount. Note that in the disclosed embodiment, the insolation normalization indicates an insolation amount normalization.

REFERENCE SIGNS LIST

1 System
2 Computer apparatus
21 Input means
22 Measurement means
23 Analysis means
24 Processing means 25 Estimation means
26 Display means
27 Management means
201 Arithmetic device
202 Main storage device
203 Auxiliary storage device
204 Input device
205 Output device
206 Communication device
207 Measurement device
2001 Program
2002 OS
DB Database
D1 Insolation probability distribution
D2 Estimated insolation probability distribution
D2A Superimposition part
D2B Exclusion part
NW Network
R1 Insolation data
R2 Insolation interpolation data
S10 First step
S20 Second step
S30 Third step
S40 Fourth step
S31 First analysis step
S32 Second analysis step
S33 Third analysis step

The invention claimed is:

1. An insolation probability distribution analysis method used in solar power generation by a solar power generation system, comprising:
a processor of a computer executing program instructions that when executed cause the processor to:
receive an input of insolation data measured by a measurement device indicating an amount of solar radiation reaching a solar panel of the solar power generation system, and storing the insolation data in a database;
determine an insolation probability distribution based on the insolation data;
determine an insolation estimation model that consists of a first mode and a first deviation associated with a first probability density function, a second mode and a second deviation associated with a second probability density function, a distribution coefficient of the first probability density function, and a distribution coefficient of the second probability density function based on the insolation probability distribution, the first probability density function, and the second probability density function, and storing the insolation estimation model in the database;
store an integrated value indicating an overlap of probability distributions based on the insolation estimation model in the database as a degree of superposition, and
predict the solar power generation by the solar power generation system based on the insolation data,
wherein the first probability density function and the second probability density function are Gaussian functions.

2. The insolation probability distribution analysis method according to claim 1, wherein the program instructions when executed further cause the processor to:
determine a weighted average of an insolation associated with the insolation data based on at least one of the first mode, the first deviation, the second mode, the second deviation, the distribution coefficient of the first probability density function, and the distribution coefficient of the second probability density function included in the insolation estimation model, and the first probability density function and the second probability density function.

3. The insolation probability distribution analysis method according to claim 1, wherein the program instructions when executed further cause the processor to:
perform display processing for displaying the insolation probability distribution and the probability distribution based on the insolation estimation model in such a manner that the respective distributions overlap with each other.

4. An insolation probability distribution analysis system used in solar power generation by a solar power generation system, comprising:
a processor of a computer; and
program instructions that are executable by the processor that when executed cause the processor to:
receive an input of insolation data measured by a measurement device indicating an amount of solar radiation reaching a solar panel of the solar power generation system, and store the insolation data in a database;
determine an insolation probability distribution based on the insolation data;
determine an insolation estimation model that consists of a first mode and a first deviation associated with a first probability density function, a second mode and a second deviation associated with a second probability density function, a distribution coefficient of the first probability density function, and a distribution coefficient of the second probability density function based on the insolation probability distribution, the first probability density function, and the second probability density function, and storing the insolation estimation model in the database;
store an integrated value indicating an overlap of probability distributions based on the insolation estimation model in the database as a degree of superposition, and
predict the solar power generation by the solar power generation system based on the insolation data,
wherein the first probability density function and the second probability density function are Gaussian functions.

5. An insolation probability distribution analysis program stored on a non-transitory computer-readable storage medium, wherein the insolation probability distribution analysis program is used in solar power generation by a solar power generation system, and wherein the insolation probability distribution analysis program when executed causes a computer to:
receive an input of insolation data measured by a measurement device indicating an amount of solar radiation reaching a solar panel of the solar power generation system, and store the insolation data in a database;
determine an insolation probability distribution based on the insolation data;
determine an insolation estimation model that consists of a first mode and a first deviation associated with a first probability density function, a second mode and a second deviation associated with a second probability density function, a distribution coefficient of the first probability density function, and a distribution coefficient of the second probability density function based on the insolation probability distribution, the first probability density function, and the second probability density function, and storing the insolation estimation model in the database;

store an integrated value indicating an overlap of probability distributions based on the insolation estimation model in the database as a degree of superposition, and predict the solar power generation by the solar power generation system based on the insolation data, wherein the first probability density function and the second probability density function are Gaussian functions.

6. An insolation normalization statistical analysis method used in solar power generation by a solar power generation system, comprising:

a processor of a computer executing program instructions that when executed cause the processor to:

receive an input of insolation data measured by a measurement device indicating an amount of solar radiation reaching a solar panel of the solar power generation system;

extract a reference insolation by performing interpolation based on polynomial approximation into the insolation data, determine a dimensionless amount that is a ratio of an insolation and the reference insolation, and determine an insolation probability distribution that uses the dimensionless amount as a random variable based on the insolation data, and predict the solar power generation by the solar power generation system based on the insolation data.

7. The insolation normalization statistical analysis method according to claim 6, wherein the reference insolation is an average value of insolation obtained for each day or each month.

8. The insolation normalization statistical analysis method according to claim 6, wherein the program instructions when executed further cause the processor to:

perform display processing of the insolation probability distribution.

9. The insolation normalization statistical analysis method according to claim 6, wherein the insolation probability distribution corresponds to an estimated insolation probability distribution determined by curve fitting processing based on a mixed Gaussian function including a first Gaussian function and a second Gaussian function.

10. An insolation normalization statistical analysis system used in solar power generation by a solar power generation system, comprising:

a processor of a computer; and program instructions that are executable by the processor that when executed cause the processor to:

receive an input of insolation data measured by a measurement device indicating an amount of solar radiation reaching a solar panel of the solar power generation system;

extract a reference insolation by performing interpolation based on polynomial approximation into the insolation data, determine a dimensionless amount that is a ratio of an insolation and the reference insolation, and determine an insolation probability distribution that uses the dimensionless amount as a random variable based on the insolation data, and predict the solar power generation by the solar power generation system based on the insolation data.

11. An insolation normalization statistical analysis program stored on a non-transitory computer-readable storage medium, wherein the insolation normalization statistical analysis program is used in solar power generation by a solar power generation system, and wherein the insolation normalization statistical analysis program when executed causes a computer to:

receive an input of insolation data measured by a measurement device indicating an amount of solar radiation reaching a solar panel of the solar power generation system;

extract a reference insolation by performing interpolation based on polynomial approximation into the insolation data, determine a dimensionless amount that is a ratio of an insolation and the reference insolation, and determine an insolation probability distribution that uses the dimensionless amount as a random variable based on the insolation data, and predict the solar power generation by the solar power generation system based on the insolation data.

* * * * *